United States Patent
Yanko et al.

(10) Patent No.: US 9,213,869 B2
(45) Date of Patent: *Dec. 15, 2015

(54) MAGNETIC STRIPE READING DEVICE

(71) Applicant: VERIFONE, INC., San Jose, CA (US)

(72) Inventors: Igal Yosef Yanko, Carmichael, CA (US); John Henry Barrowman, Knoxville, TN (US); Scott William McKibben, Davis, CA (US)

(73) Assignee: VERIFONE, INC., San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/046,226

(22) Filed: Oct. 4, 2013

(65) Prior Publication Data

US 2015/0097033 A1    Apr. 9, 2015

(51) Int. Cl.
*G06K 7/08* (2006.01)

(52) U.S. Cl.
CPC ..................... *G06K 7/083* (2013.01)

(58) Field of Classification Search
CPC .............................. G06K 7/084; G06K 7/088
USPC .............. 235/449, 493, 453; 340/539.26, 541
See application file for complete search history.

(56) References Cited

U.S. PATENT DOCUMENTS

| | | |
|---|---|---|
| 3,466,643 A | 9/1969 | Moorefield |
| 3,735,353 A | 5/1973 | Donovan et al. |
| 3,818,330 A | 6/1974 | Hiroshima et al. |
| 3,941,964 A | 3/1976 | Yoder |
| 4,486,637 A | 12/1984 | Chu |
| 4,527,030 A | 7/1985 | Oelsch |
| 4,593,384 A | 6/1986 | Kleijne |
| 4,749,368 A | 6/1988 | Mouissie |

(Continued)

FOREIGN PATENT DOCUMENTS

| | | |
|---|---|---|
| DE | 2 241 738 | 8/1974 |
| DE | 601 01 096 | 7/2004 |

(Continued)

OTHER PUBLICATIONS

Communication dated Jul. 11, 2014, from the U.S. Patent and Trademark Office in counterpart U.S. Appl. No. 12/355,857.

(Continued)

*Primary Examiner* — Daniel St Cyr
(74) *Attorney, Agent, or Firm* — Sughrue Mion, PLLC (57) ABSTRACT

A magnetic stripe reading device including a magnetic head assembly including a mounting element defining a circumferential anti-tampering enclosure and at least one information reading sensor having output contacts, a protective layer including at least one protective grid and at least one anti-tampering contact array including at least two electrical contacts, at least one resiliently deformable conductive element arranged to selectably provide a galvanic interconnection between the electrical contacts, a closure element fixed to the assembly in a secure orientation to displace the deformable conductive element into galvanic interconnection contact with the electrical contacts, whereby tampering with the closure element causes the deformable conductive element to break the galvanic interconnection contact and a flat cable coupled to the output contacts, to the protective layer and to the electrical contacts and carrying electrical signals useful for providing a tampering alarm indication when the electrical contacts are not in galvanic contact.

16 Claims, 5 Drawing Sheets

(56) References Cited

U.S. PATENT DOCUMENTS

| | | | |
|---|---|---|---|
| 4,807,284 A | 2/1989 | Kleijne | |
| 4,847,595 A | 7/1989 | Okamoto | |
| 4,877,947 A | 10/1989 | Mori | |
| 5,086,292 A | 2/1992 | Johnson et al. | |
| 5,237,307 A | 8/1993 | Gritton | |
| 5,239,664 A | 8/1993 | Verrier et al. | |
| 5,321,143 A | 6/1994 | Sharpless | |
| 5,353,350 A | 10/1994 | Unsworth et al. | |
| 5,506,566 A | 4/1996 | Oldfield et al. | |
| 5,559,311 A | 9/1996 | Gorbatoff | |
| 5,561,282 A | 10/1996 | Price | |
| 5,586,042 A | 12/1996 | Pisau et al. | |
| 5,627,520 A | 5/1997 | Grubbs et al. | |
| 5,675,319 A | 10/1997 | Rivenberg et al. | |
| 5,809,143 A | 9/1998 | Hughes | |
| 5,861,662 A | 1/1999 | Candelore | |
| 5,877,547 A | 3/1999 | Rhelimi | |
| 5,998,858 A | 12/1999 | Little et al. | |
| 6,288,640 B1 | 9/2001 | Gagnon | |
| 6,359,338 B1 | 3/2002 | Takabayashi | |
| 6,396,400 B1 | 5/2002 | Epstein, III et al. | |
| 6,414,884 B1 | 7/2002 | DeFelice et al. | |
| 6,438,825 B1 | 8/2002 | Kuhn | |
| 6,463,263 B1 | 10/2002 | Feilner et al. | |
| 6,466,118 B1 | 10/2002 | Van Zeeland et al. | |
| 6,563,488 B1 | 5/2003 | Rogers et al. | |
| 6,571,948 B2 | 6/2003 | Jones | |
| 6,633,241 B2 | 10/2003 | Kaikuranta et al. | |
| 6,646,565 B1 | 11/2003 | Fu et al. | |
| 6,669,100 B1 | 12/2003 | Rogers et al. | |
| 6,830,182 B2 | 12/2004 | Izuyama | |
| 6,853,093 B2 | 2/2005 | Cohen et al. | |
| 6,874,092 B1 | 3/2005 | Motoyama et al. | |
| 6,912,280 B2 | 6/2005 | Henry | |
| 6,917,299 B2 | 7/2005 | Fu et al. | |
| 6,921,988 B2 | 7/2005 | Moree | |
| 6,936,777 B1 | 8/2005 | Kawakubo | |
| 7,170,409 B2 | 1/2007 | Ehrensvard et al. | |
| 7,270,275 B1 | 9/2007 | Moreland et al. | |
| 7,283,066 B2 | 10/2007 | Shipman | |
| 7,309,012 B2 | 12/2007 | Mueller et al. | |
| 7,497,378 B2 | 3/2009 | Aviv | |
| 7,528,717 B2 | 5/2009 | Benjelloun et al. | |
| 7,597,261 B2 | 10/2009 | Aviv | |
| 7,784,691 B2 | 8/2010 | Mirkazemi-Moud et al. | |
| 7,835,521 B1 | 11/2010 | Pinheiro | |
| 7,843,339 B2 | 11/2010 | Kirmayer | |
| 7,898,413 B2 | 3/2011 | Hsu et al. | |
| 8,358,218 B2 | 1/2013 | Neo et al. | |
| 8,513,548 B2 | 8/2013 | Rollet | |
| 8,595,514 B2 | 11/2013 | Mirkazemi-Moud et al. | |
| 8,760,292 B2 * | 6/2014 | Neo et al. | 340/541 |
| 2001/0032211 A1 | 10/2001 | Kuzumaki | |
| 2004/0031673 A1 | 2/2004 | Levy | |
| 2004/0118670 A1 | 6/2004 | Park et al. | |
| 2004/0120101 A1 | 6/2004 | Cohen et al. | |
| 2005/0081049 A1 | 4/2005 | Nakayama et al. | |
| 2005/0138433 A1 | 6/2005 | Linetsky | |
| 2005/0184870 A1 | 8/2005 | Galperin et al. | |
| 2006/0049255 A1 | 3/2006 | Von Mueller et al. | |
| 2006/0049256 A1 | 3/2006 | Von Mueller et al. | |
| 2006/0192653 A1 | 8/2006 | Atkinson et al. | |
| 2007/0016963 A1 | 1/2007 | Robinson | |
| 2007/0040674 A1 | 2/2007 | Hsu | |
| 2007/0102272 A1 | 5/2007 | Sano et al. | |
| 2007/0152042 A1 | 7/2007 | Mittler | |
| 2007/0196156 A1 | 8/2007 | Lewis | |
| 2007/0204173 A1 | 8/2007 | Kuhn | |
| 2008/0135617 A1 | 6/2008 | Aviv | |
| 2008/0180245 A1 | 7/2008 | Hsu et al. | |
| 2008/0278353 A1 | 11/2008 | Smith et al. | |
| 2008/0296378 A1 | 12/2008 | Aviv | |
| 2009/0058628 A1 | 3/2009 | Kirmayer | |
| 2009/0184850 A1 | 7/2009 | Schulz et al. | |
| 2011/0063109 A1 | 3/2011 | Ostermöller | |
| 2011/0215938 A1 | 9/2011 | Neo et al. | |
| 2011/0248860 A1 | 10/2011 | Avital et al. | |
| 2011/0279279 A1 * | 11/2011 | Mirkazemi-Moud et al. | 340/635 |
| 2012/0025983 A1 | 2/2012 | Ben-Zion et al. | |
| 2012/0106113 A1 | 5/2012 | Kirmayer et al. | |
| 2012/0180140 A1 | 7/2012 | Barrowman et al. | |
| 2013/0067534 A1 | 3/2013 | Soffer | |
| 2013/0106606 A1 | 5/2013 | Neo | |

FOREIGN PATENT DOCUMENTS

| | | |
|---|---|---|
| EP | 0 375 545 | 6/1990 |
| EP | 1 421 549 | 5/2004 |
| EP | 1 432 031 | 6/2004 |
| EP | 1432031 | 6/2004 |
| EP | 1 676 182 | 7/2006 |
| FR | 2911000 | 7/2008 |
| GB | 892198 | 3/1962 |
| GB | 1 369 739 | 10/1974 |
| GB | 8608277 | 4/1986 |
| GB | 2178235 | 2/1987 |
| GB | 2372363 | 8/2002 |
| GB | 2411756 | 9/2006 |
| JP | 10293915 | 11/1998 |
| JP | 10299315 | 11/1998 |
| JP | 2002108711 | 4/2002 |
| JP | 2003100169 | 4/2003 |
| WO | 01/63994 | 8/2001 |
| WO | 03/019467 | 3/2003 |
| WO | 2005/041002 | 5/2005 |
| WO | 2009/091394 | 7/2009 |
| WO | 2005/086546 | 9/2009 |
| WO | 2010/082190 | 7/2010 |

OTHER PUBLICATIONS

U.S. Appl. No. 61/011,993, filed Jan. 22, 2008.
An Office Action dated Feb. 12, 2009, which issued during the prosecution of U.S. Appl. No. 12/191,343.
A Notice of Allowance dated Sep. 13, 2013, which issued during the prosecution of U.S. Appl. No. 12/666,054.
An Office Action dated Nov. 21, 2013, which issued during the prosecution of U.S. Appl. No. 13/717,957.
A Notice of Allowance dated Oct. 19, 2012, which issued during the prosecution of U.S. Appl. No. 12/715,794.
An Office Action dated May 13, 2010, which issued during the prosecution of Applicant's U.S. Appl. No. 11/845,435.
An Office Action dated Jul. 2, 2012, which issued during the prosecution of U.S. Appl. No. 12/715,794.
A Notice of Allowance dated Sep. 10, 2010, which issued during the prosecution of Applicant's U.S. Appl. No. 11/845,435.
Van Ess, Dave; "Capacitive touch switches for automotive applications", http://www.automotivedesignline.com/, Feb. 2006.
Victor Kremin, et al., "Capacitive sensing—waterproof capacitance sensing", Cypress Perform, Dec. 2006.
A Notice of Allowance dated Jun. 26, 2009, which issued during the prosecution of U.S. Appl. No. 12/191,343.
A Notice of Allowance dated Oct. 26, 2004, which issued during the prosecution of U.S. Appl. No. 10/326,726.
An Office Action dated May 28, 2004, which issued during the prosecution of U.S. Appl. No. 10/326,726.
An Office Action dated Apr. 10, 2012, which issued during the prosecution of U.S. Appl. No. 12/758,150.
An International Search Report and a Written Opinion both dated Apr. 30, 2012, which issued during the prosecution of Applicant's PCT/US2012/020142.
An International Preliminary Report on Patentability dated Jul. 19, 2011 which issued during the prosecution of Applicant' s PCT/IL2009/000724.

* cited by examiner

MAGNETIC STRIPE READING DEVICE

REFERENCE TO RELATED APPLICATIONS

Reference is hereby made to U.S. Pat. Nos. 6,853,093; 5,998,858; 5,861,662 and 6,917,299, the disclosures of which are hereby incorporated by reference.

FIELD OF THE INVENTION

The present invention relates to magnetic card readers generally and to devices, such as point of sale devices, employing magnetic card readers.

SUMMARY OF THE INVENTION

The present invention seeks to provide an improved magnetic card reader.

There is thus provided in accordance with a preferred embodiment of the present invention a magnetic stripe reading device including a magnetic head assembly including a mounting element defining a circumferential anti-tampering enclosure and at least one information reading sensor having output contacts, the at least one information reading sensor being mounted in the mounting element, a protective layer including at least one protective grid and at least one anti-tampering contact array including at least two electrical contacts, at least one resiliently deformable conductive element arranged to selectably provide a galvanic interconnection between the at least two electrical contacts of the at least one anti-tampering contact array, a closure element fixed to the magnetic head assembly in a secure orientation such that the closure element displaces the at least one resilient deformable conductive element into galvanic interconnection contact with the at least two electrical contacts of the at least one anti-tampering contact array, whereby tampering with the closure element causes the at least one resilient deformable conductive element to break the galvanic interconnection contact with the at least two electrical contacts of the at least one anti-tampering contact array and a flat cable coupled to the output contacts of the at least one information reading sensor and carrying electrical signals provided thereby and also coupled to the protective layer and to the at least two electrical contacts and carrying electrical signals useful for providing a tampering alarm indication when the at least two electrical contacts are not in galvanic contact.

There is also provided in accordance with another preferred embodiment of the present invention a point-of-sale device including a housing defining a keypad array location at which an array of keys are located and a display location at which a display is located, a magnetic card reader assembly associated with the housing and including a slot and magnetic stripe reading device, the magnetic stripe reading device including a magnetic head assembly including a mounting element defining a circumferential anti-tampering enclosure and at least one information reading sensor having output contacts, the at least one information reading sensor being mounted in the mounting element, a protective layer including at least one protective grid and at least one anti-tampering contact array including at least two electrical contacts, at least one resiliently deformable conductive element arranged to selectably provide a galvanic interconnection between the at least two electrical contacts of the at least one anti-tampering contact array, a closure element fixed to the magnetic head assembly in a secure orientation such that the closure element displaces the at least one resilient deformable conductive element into galvanic interconnection contact with the at least two electrical contacts of the at least one anti-tampering contact array, whereby tampering with the closure element causes the at least one resilient deformable conductive element to break the galvanic interconnection contact with the at least two electrical contacts of the at least one anti-tampering contact array and a flat cable coupled to the output contacts of the at least one information reading sensor and carrying electrical signals provided thereby and also coupled to the protective layer and to the at least two electrical contacts and carrying electrical signals useful for providing a tampering alarm indication when the at least two electrical contacts are not in galvanic contact.

Preferably, the protective layer and the at least one anti-tampering contact array are both located on the same plane. Additionally or alternatively, the protective layer surrounds the at least one anti-tampering contact array.

In accordance with a preferred embodiment of the invention the magnetic stripe reading device also includes anti-tamper circuitry coupled via the flat cable to the protective layer and to the at least two electrical contacts and providing a tampering alarm indication when the at least two electrical contacts are not in galvanic contact and when the at least one protective grid is compromised. Additionally, the flat cable is also provided with protective grids extending along first and second opposite flat surfaces thereof and coupled to the anti-tamper circuitry, thereby surrounding at least a portion of the cable including elements which carry the electrical signals from the at least one information reading sensor.

Preferably, the flat cable is also provided with protective grids extending along first and second opposite flat surfaces thereof, thereby surrounding at least a portion of the cable including elements which carry the electrical signals from the at least one information reading sensor.

In accordance with a preferred embodiment of the present invention the protective layer and the flat cable are integrally formed.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
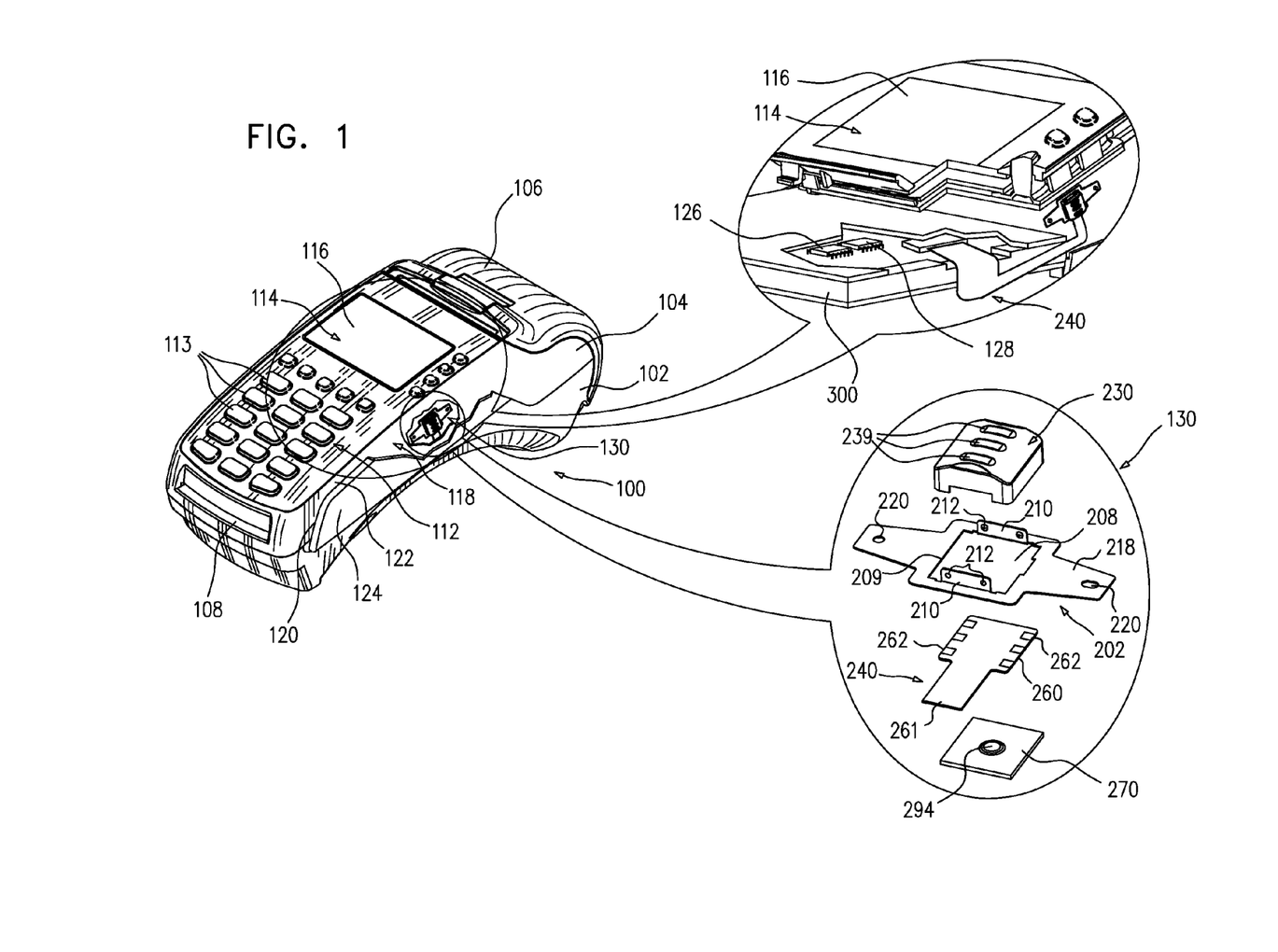
FIG. 1 is a simplified illustration of a point of sale (POS) terminal including a magnetic stripe reading device constructed and operative in accordance with a preferred embodiment of the present invention.

Reference is now made to FIG. 1, which illustrates a point of sale terminal constructed and operative in accordance with a preferred embodiment of the present invention. As seen in FIG. 1, the point of sale terminal may be generally similar in structure and function to a conventional point of sale terminal such as a VX520, commercially available from Verifone, Inc. It is appreciated that the present invention is not limited in its application to a given type or model of point of sale terminal but is applicable to magnetic stripe reading devices useful in any suitable point of sale device. Such a point of sale device may include, for example, a check reader, a card-based payment terminal, an electronic cash register, a PIN pad, an automatic teller machine (ATM), an automated kiosk and an electronic vending machine.

As seen in FIG. 1, the point of sale terminal preferably includes a housing 100 including a base portion 102 and a top portion 104, which are typically fastened together with screws, sonically welded together or snap-fitted together. In the illustrated embodiment, the housing also includes a printer housing portion 106. The top portion 104 of housing 100 preferably defines a smart-card insertion slot 108, which communicates with a smart-card reader (not shown) located within the housing. The top portion 104 of the housing 100 also defines a keypad array location 112 wherein an array of keys 113 are located, and a display location 114, where a display, such as an LCD display 116, is located. Additionally, the top portion 104 of housing 100 preferably defines a magnetic card reader assembly 118, which includes a slot 120 having spaced surfaces 122 and 124. Secure electrical data processing circuitry 126, for processing transaction data, is preferably located in housing 100, as is anti-tamper circuitry 128. A magnetic head assembly 130 is mounted on surface 122, typically on an inside wall of surface 122 for reading transaction data from a magnetic stripe bearing card. Preferably, surface 122 includes an aperture (not shown) through which reading heads of magnetic head assembly 130 protrude for reading transaction data from a magnetic stripe bearing card.

A printer (not shown) is disposed within printer housing portion 106 and cooperates with a roll of paper (not shown), which is supported on a paper roll holder (not shown) located within printer housing portion 106.

Figure 2A:
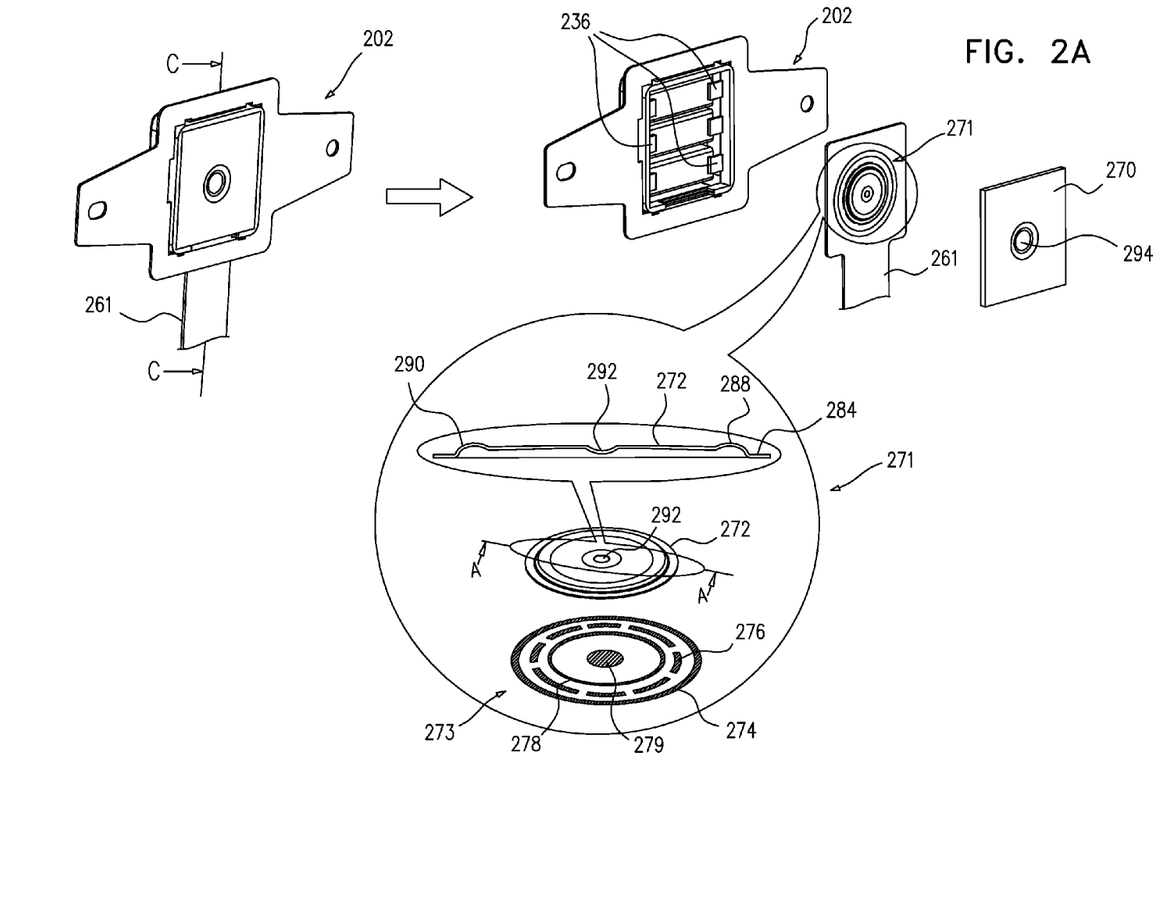
FIGS. 2A & 2B are respective simplified exploded view illustrations of the magnetic stripe reading device shown in FIG. 1 taken in first and second mutually oppositely directed views.
Figure 2B:
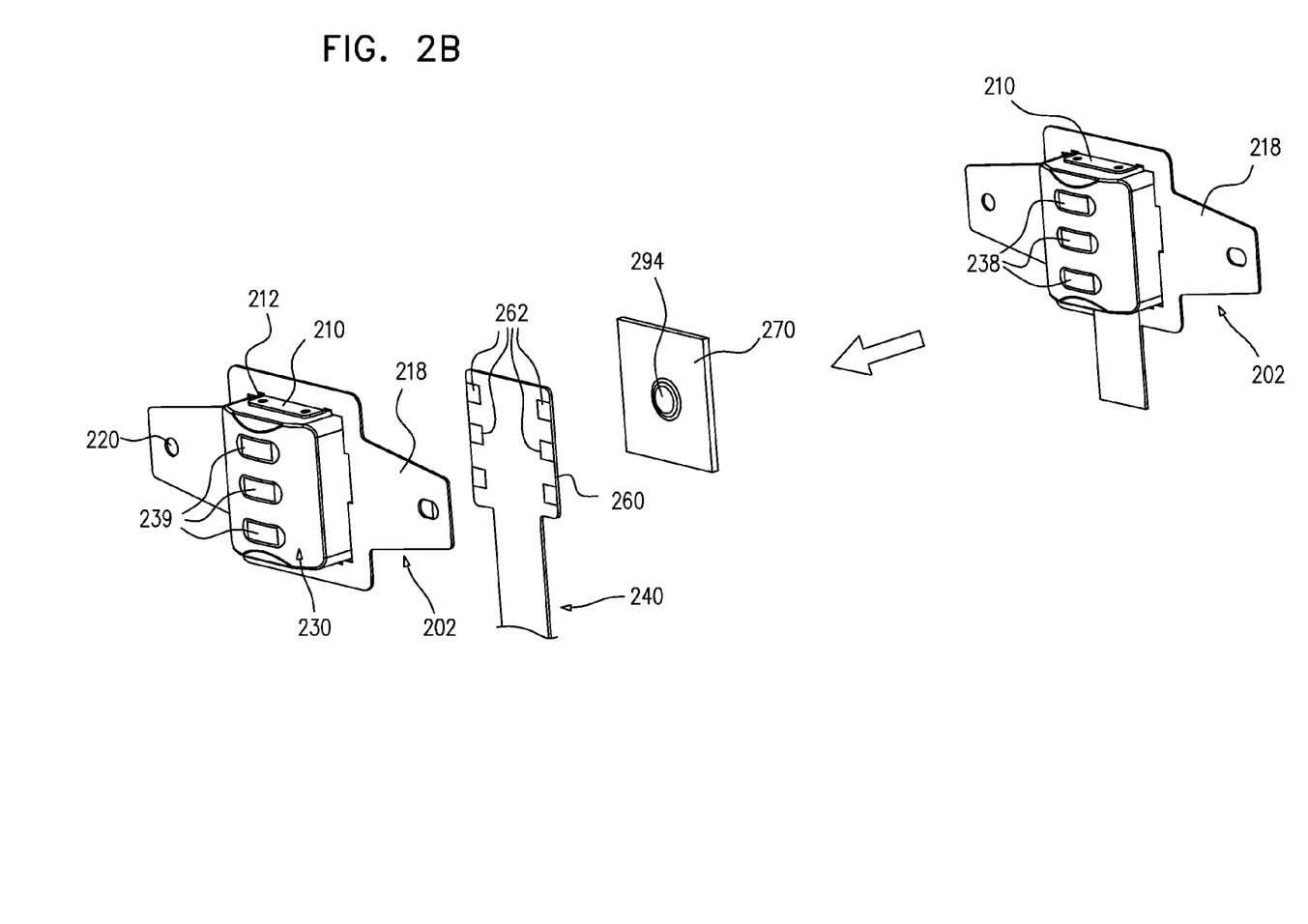
Figure 2C:
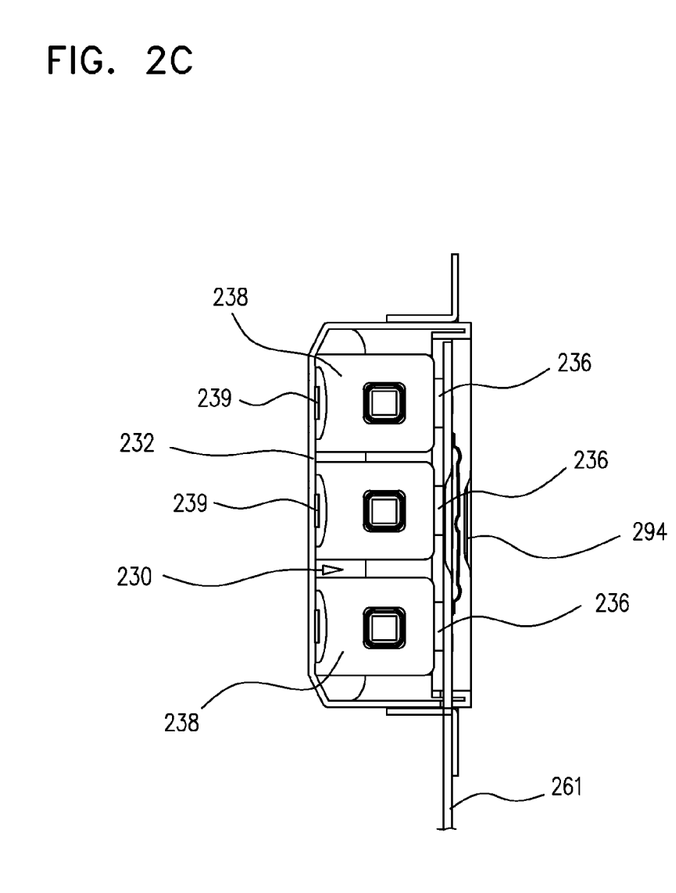
FIG. 2C is a simplified sectional illustration of the magnetic stripe reading device of FIG. 2A, taken along lines C-C in FIG. 2A.
Figure 3:
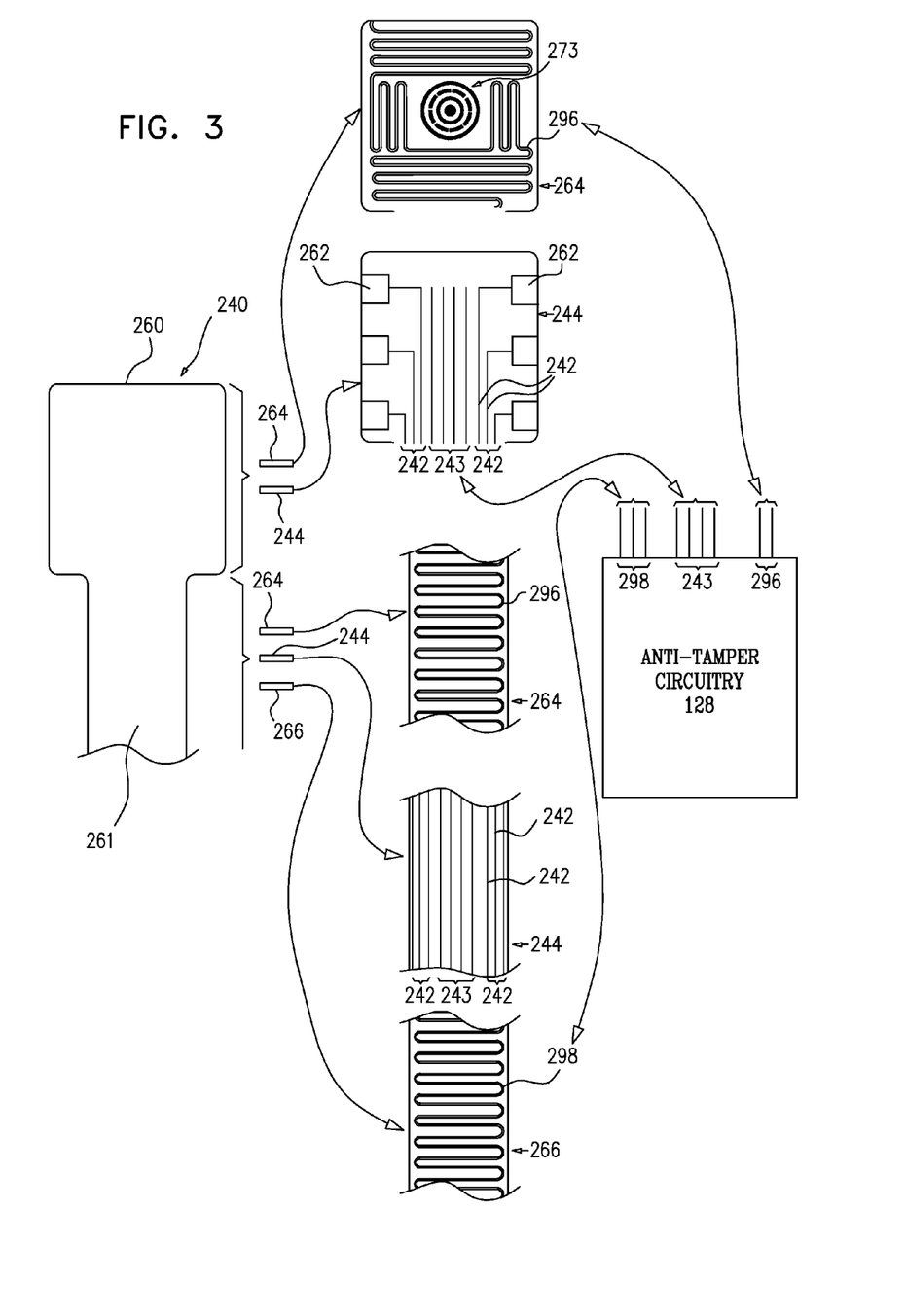
FIG. 3 is a simplified illustration of a tamper protected conductor assembly forming part of the magnetic stripe reading device of FIG. 1-2C.

Reference is now made additionally to FIGS. 2A - 2C and 3, which illustrate a magnetic head assembly 130 constructed and operative in accordance with a preferred embodiment of the present invention, which is useful in the magnetic card reader assembly 118. As seen in FIGS. 1 - 3, the magnetic head assembly 130 preferably comprises a mounting element 202 which is typically mounted onto surface 122 of top portion 104.

Mounting element 202 is preferably formed of metal and preferably defines a cut-out 208 bordered on four sides by a generally square frame 209. On two mutually opposite sides of cut-out 208 there are provided upstanding wall portions 210, each having a pair of mutually spaced apertures 212 formed therein. Extending in mutually opposite directions from frame 209 on the two remaining sides of the cut-out 208 are two generally planar, somewhat flexible mounting portions 218 having mounting apertures 220 formed therein for mounting the magnetic head assembly head 130 onto surface 122.

An information reading sensor 230, preferably a magnetic stripe reading sensor, such as an Apollo AP-R3337, commercially available from Apollo (Zhuhai) Electronics Co., Ltd. Apollo Building, Lanpu Industrial Area E, Jiuzhou Road, Zhuhai, China 519070, is mounted onto mounting element 202 at cut-out 208 and is mounted onto upstanding wall portions 210, such that a reading surface 232 of the sensor 230 extends outside of the frame 209 and the back of the sensor, having electrical contacts 236 thereon, lies inwardly of frame 209. Information reading sensor 230 typically includes three sensing heads 238, each having a corresponding sensing surface 239 and a pair of contacts 236. It is appreciated that one or two sensing heads 238 may alternatively be employed.

As is seen with particular clarity in FIG. 3, in accordance with a preferred embodiment of the present invention, a flat cable and connector assembly 240 is provided, having a plurality of conductors 242 and 243 disposed in a data conductor plane 244. The flat cable and connector assembly 240 includes a connector portion 260 and a cable portion 261, preferably a flexible flat cable. Connector portion 260 preferably includes in conductor plane 244, three pairs of contact pads 262 for electrical connection to the corresponding three pairs of contacts 236 of respective sensing heads 238 (FIG. 2B).

The contacts 236 are preferably connected to contact pads 262 of connector portion 260 by hot-bar soldering, use of conductive adhesive, or any other suitable method, thereby establishing an electrical data connection between the sensor 230 and conductors 242, for communicating the data read by sensing heads 238 to circuitry 126 for further processing.

The data conductor plane 244 extends along both the connector portion 260 and the cable portion 261. An additional plane 264 also extends along both the connector portion 260 and the cable portion 261. A further plane 266 extends along the cable portion 261 on a side of data conductor plane 244 opposite to plane 264.

Anti-tamper circuitry 128 is preferably connected to one or more protective grids and sensors which sense tampering with the point of sale terminal and is preferably operable to provide a local or remote alarm indication of tampering and/or to automatically disable functions and/or erase sensitive data of the point of sale terminal in response to sensed tampering.

It is a particular feature of the present invention that, as seen in FIGS. 1-3, additional anti-tampering functionality is provided for preventing unauthorized access to the output of sensor 230 and more particularly to electrical contacts 236. This additional anti-tampering functionality is preferably provided by a metal cover 270 which is preferably laser soldered onto mounting element 202, overlying connector portion 260 and thus physically preventing access to electrical contacts 236 and contact pads 262.

It is a further particular feature of the present invention that, as seen in FIGS. 1-3, and more particularly in FIGS. 2A, 2B and 2C, further anti-tampering functionality is provided by an anti-tamper switch assembly 271, including at least one resiliently deformable conductive element 272 and an array 273 of electrical contacts preferably located on plane 264 of flat cable and connector assembly 240. The deformable conductive element 272 establishes electrical contact with at least some of the array of electrical contacts 273 only when the magnetic head assembly 130 is intact and metal cover 270 is not removed.

The array of electrical contacts 273 preferably includes an outer ring 274, an optionally segmented outer intermediate ring 276, an inner intermediate ring 278, and a central contact 279. It is appreciated that outer intermediate ring 276 may be a continuous ring or may be divided into any number of segments.

The resiliently deformable conductive element 272 preferably includes an at least partially continuous circumferential flange 284 fixed at at least two locations (not shown) thereat in electrical contact with at least two segments of outer intermediate ring 276, a circumferential portion 288 having a cross-sectional configuration which includes two mutually spaced arches 290 and a central portion 292 disposed in a tamper-indicating operative orientation at a first distance from the base surface.

Resiliently deformable conductive element 272 is arranged to selectably provide a galvanic interconnection between central contact 279 and outer intermediate ring 276 formed on plane 264 of connector portion 260.

Outer ring 274, outer intermediate ring 276, inner intermediate ring 278 and central contact 279 are preferably all connected by conductors 243 to anti-tampering circuitry 128.

In accordance with a preferred embodiment of the present invention, when the magnetic head assembly 130 is intact and thus metal cover 270 has not been removed, at least one closure protrusion 294 preferably integrally formed with metal cover 270, displaces the resilient deformable conductive element 272 into galvanic interconnection contact with the at least two electrical contacts 276 and 279 in the absence of tampering. It is appreciated that tampering with metal cover 270 causes the at least one resilient deformable conductive element 272 to break the galvanic interconnection contact with the at least two electrical contacts 276 and 279 and to provide an alarm indication.

It is a particular feature of the present invention that array 273 on plane 264 of the flat cable and connector assembly 240 is surrounded by a protective wire grid 296, which provides additional anti-tamper protection.

In accordance with a preferred embodiment of the present invention, as seen in FIGS. 2A - 3, protective wire grid 296 extends in plane 264 from connector portion 260 along cable portion 261 and is preferably coupled to anti-tamper circuitry 128.

Preferably, additionally, a protective wire grid 298 is formed on plane 266 and is connected to anti-tamper circuitry 128.

It is appreciated that the various connections to anti-tamper circuitry 128 may be modified, for example, such that protective wire grids 296 and 298 may be connected in series and that conductors 243 may be connected in series with either or both protective wire grids 296 and 298. Anti-tamper circuitry 128 may be operative to erase encryption keys or other sensitive data upon sensed tampering with either or both of grids 296 and 298 and/or conductors 243 and/or at least one of electrical contact array 273 or upon sensed breaking of galvanic contact between resilient deformable conductive element 272 and electrical contacts 276 and 279.

It is additionally appreciated that anti-tampering circuitry 128 is preferably located within a protected region 300 within housing 100, of the type described and claimed in assignee's U.S. Pat. No. 6,853,093, the disclosure of which is hereby incorporated by reference.

A layer of epoxy (not shown) may be provided over connector portion 260.

An attempt to attack anti-tamper switch assembly 271 by short-circuiting central contact 279 and outer intermediate ring 276 will also short circuit inner intermediate ring 278 with contact 279 and/or outer intermediate ring 276 or short circuit outer ring 274 with outer intermediate ring 276 and may be detected by anti-tamper circuitry 128.

Attempts to attack the switch assembly 271, as by applying conductive adhesive under resiliently deformable conductive element 272 or inserting a conductive element under resiliently deformable conductive element 272 may be made in order to establish an electrical connection between ring 276 and central contact 279 even when the metal cover is removed.

Such attempts can be expected to result in establishment of an electrical connection between the resiliently deformable conductive element 272, rings 276 and central contact 279 on the one hand and at least one of rings 276 and 278, thus producing an alarm.

Furthermore, the angular displacement of resiliently deformable conductive element 272 between open and closed operative orientations of the housing is small, resulting in high reliability of reversion to an open orientation when the housing is opened, even after having been closed for a long time.

Various types of suitable anti-tamper circuitry 128 are described in the following patent publications, the disclosures of which are hereby incorporated by reference: U.S. Pat. Nos. 5,998,858; 5,861,662 and 6,917,299.

It is appreciated that the anti-tamper circuitry 128 may transmit dynamically changing signals along the various protective grids and conductors, including grids 296 and 298, thereby to make it more difficult to attach the device. Furthermore, the dynamically changing signals may be designed to include signal portions similar to data signals such that an unauthorized person tapping into the conductors 242 may receive signals that appear to be data signals but have no information content. Preferably the protective grids are highly densely arranged.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A magnetic stripe reading device comprising:
a magnetic head assembly including:
 a mounting element defining a circumferential anti-tampering enclosure; and
 at least one information reading sensor having output contacts, said at least one information reading sensor being mounted in said mounting element;
a protective layer including:
 at least one protective grid; and
 at least one anti-tampering contact array including at least two electrical contacts;
at least one resiliently deformable conductive element arranged to selectably provide a galvanic interconnection between said at least two electrical contacts of said at least one anti-tampering contact array;
a closure element fixed to said magnetic head assembly in a secure orientation such that said closure element displaces said at least one resilient deformable conductive element into galvanic interconnection contact with said at least two electrical contacts of said at least one anti-tampering contact array, whereby tampering with said closure element causes said at least one resilient deformable conductive element to break said galvanic interconnection contact with said at least two electrical contacts of said at least one anti-tampering contact array; and
a flat cable coupled to said output contacts of said at least one information reading sensor and carrying electrical signals provided thereby and also coupled to said protective layer and to said at least two electrical contacts and carrying electrical signals useful for providing a tampering alarm indication when said at least two electrical contacts are not in galvanic contact.

2. A magnetic stripe reading device according to claim 1 and wherein said protective layer and said at least one anti-tampering contact array are both located on the same plane.

3. A magnetic stripe reading device according to claim 2 and wherein said protective layer surrounds said at least one anti-tampering contact array.

4. A magnetic stripe reading device according to claim 1 and wherein said protective layer surrounds said at least one anti-tampering contact array.

5. A magnetic stripe reading device according to claim 1 and also comprising anti-tamper circuitry coupled via said flat cable to said protective layer and to said at least two electrical contacts and providing a tampering alarm indication when said at least two electrical contacts are not in galvanic contact and when said at least one protective grid is compromised.

6. A magnetic stripe reading device according to claim 5 and wherein said flat cable is also provided with protective grids extending along first and second opposite flat surfaces thereof and coupled to said anti-tamper circuitry, thereby surrounding at least a portion of said cable including elements which carry said electrical signals from said at least one information reading sensor.

7. A magnetic stripe reading device according to claim 1 and wherein said flat cable is also provided with protective grids extending along first and second opposite flat surfaces thereof, thereby surrounding at least a portion of said cable including elements which carry said electrical signals from said at least one information reading sensor.

8. A magnetic stripe reading device according to claim 1 and wherein said protective layer and said flat cable are integrally formed.

9. A point-of-sale device comprising:
a housing defining a keypad array location at which an array of keys are located and a display location at which a display is located;
a magnetic card reader assembly associated with the housing and including a slot and magnetic stripe reading device, said magnetic stripe reading device comprising:
a magnetic head assembly including:
a mounting element defining a circumferential anti-tampering enclosure; and
at least one information reading sensor having output contacts, said at least one information reading sensor being mounted in said mounting element;
a protective layer including at least one protective grid and at least one anti-tampering contact array including at least two electrical contacts;
at least one resiliently deformable conductive element arranged to selectably provide a galvanic interconnection between said at least two electrical contacts of said at least one anti-tampering contact array;
a closure element fixed to said magnetic head assembly in a secure orientation such that said closure element displaces said at least one resilient deformable conductive element into galvanic interconnection contact with said at least two electrical contacts of said at least one anti-tampering contact array, whereby tampering with said closure element causes said at least one resilient deformable conductive element to break said galvanic interconnection contact with said at least two electrical contacts of said at least one anti-tampering contact array; and
a flat cable coupled to said output contacts of said at least one information reading sensor and carrying electrical signals provided thereby and also coupled to said protective layer and to said at least two electrical contacts and carrying electrical signals useful for providing a tampering alarm indication when said at least two electrical contacts are not in galvanic contact.

10. A point-of-sale device according to claim 9 and wherein said protective layer and said at least one anti-tampering contact array are both located on the same plane.

11. A point-of-sale device according to claim 10 and wherein said protective layer surrounds said at least one anti-tampering contact array.

12. A point-of-sale device according to claim 9 and wherein said protective layer surrounds said at least one anti-tampering contact array.

13. A point-of-sale device according to claim 9 and wherein said magnetic stripe reading device also includes anti-tamper circuitry coupled via said flat cable to said protective layer and to said at least two electrical contacts and providing a tampering alarm indication when said at least two electrical contacts are not in galvanic contact and when said at least one protective grid is compromised.

14. A point-of-sale device according to claim 13 and wherein said flat cable is also provided with protective grids extending along first and second opposite flat surfaces thereof, thereby surrounding at least a portion of said cable including elements which carry said electrical signals from said at least one information reading sensor.

15. A point-of-sale device according to claim 9 and wherein said flat cable is also provided with protective grids extending along first and second opposite flat surfaces thereof and coupled to said anti-tamper circuitry, thereby surrounding at least a portion of said cable including elements which carry said electrical signals from said at least one information reading sensor.

16. A point-of-sale device according to claim 9 and wherein said protective layer and said flat cable are integrally formed.

* * * * *